Dec. 30, 1969

J. HOOGLAND 3,486,810

FIVE COMPONENT OPTICAL OBJECTIVE

Filed July 3, 1967

INVENTOR.
Jan Hoogland
BY
Irving M. Kriegsman
ATTORNEY.

United States Patent Office 3,486,810
Patented Dec. 30, 1969

3,486,810
FIVE COMPONENT OPTICAL OBJECTIVE
Jan Hoogland, Wilton, Conn., assignor to The Perkin-Elmer Corporation, Norwalk, Conn., a corporation of New York
Filed July 3, 1967, Ser. No. 650,905
Int. Cl. G02b 9/60
U.S. Cl. 350—217                                    2 Claims

ABSTRACT OF THE DISCLOSURE

A five component six element optical objective of the modified Gauss type in which the second component is a doublet, and in which the first, fourth and fifth components are positive in power and the second and third components are negative in power.

---

This invention relates generally to optical objectives. More particularly this invention relates to a five component, six element optical objective useful in photographic, cathode ray tube and similar applications. The invention is an improvement in the type of objective known as the double Gauss of which the standard or norm consists of four components, the outer two being positive and the inner two being negative meniscus components concave toward a central air space.

The following is a list of some of the prior art optical objectives pertinent to this invention:

(1) U.S. Patent 2,683,398
(2) U.S. Patent 2,896,506
(3) U.S. Patent 3,049,975

It is an object of this invention to provide a new and improved optical objective of medium to high aperture (i.e. in the range of about F/1.5 to F/2.8), that is compact in form, that has large field coverage with very little vignetting and that has good resolution over the whole field.

It is another object of this invention to provide an optical objective that is simple in construction and that is highly corrected for astigmatism and other aberrations and has high relative illumination.

The above and other objects are achieved by constructing an optical objective according to this invention. Basically, the objective is a modified version of the double Gauss type objective and consists of five components. The first, fourth and fifth components (from the front or object side) are single elements of positive power. The second component is a cemented doublet of negative power and the third component is a single element of negative power. In one embodiment the fifth component is double convex shaped and in another embodiment the fifth component is meniscus shaped. In each embodiment the stop is located in the air space between the second and third components and the third component has a high refractive index.

A clearer concept of the scope of the invention along with other advantages and features thereof will be obtained from the following detailed description taken in conjunction with the drawings.

Figure 1:
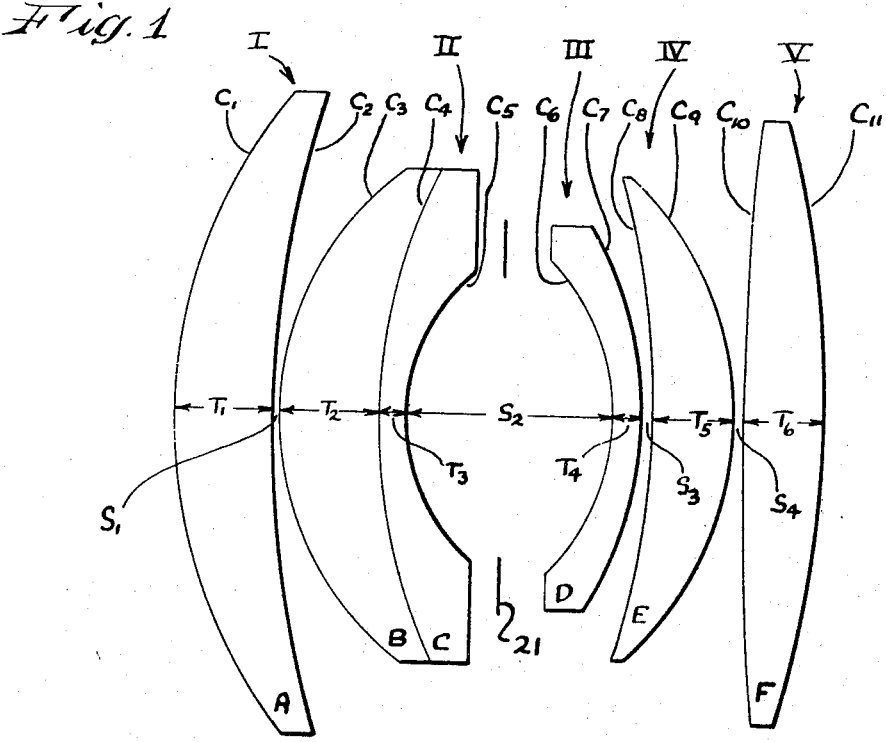
Figure 2:
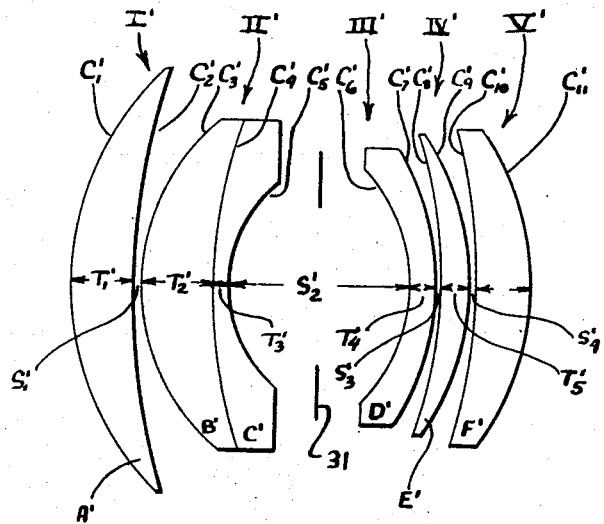

In the drawings:
FIGURE 1 is an optical diagram of one embodiment of the invention; and
FIGURE 2 is an optical diagram of another embodiment of the invention.

Referring now to FIGURE 1, there is shown an embodiment of an objective constructed according to this invention. The objective is made up of five components.

The first component (I) (starting from the front or object side of the objective) is meniscus shaped, positive in power and convex to the front. The first component (I) is made up of a single element A. The second component (II) is meniscus shaped, negative in power and convex to the front. The second component (II) is in the form of a cemented doublet consisting of a meniscus shaped positive element B and a meniscus shaped negative element C. The third component (III) is meniscus shaped, negative in power and concave to the front. The third element is made up of a single element D. The stop 21 is located in the air space between the second and third components. The fourth component (IV) is meniscus shaped, positive in power and concave to the front. The fourth component (IV) is made up of a single element E. The fifth component (V) is double convex in shape and positive in power. The fifth component (V) is made up of a single element (F).

The following table shows the constructional data for one example of an optical objective constructed according to the embodiment shown in FIGURE 1. As is well known in the art, the curvature of a surface is equal to the reciprocal of its radius. In the table, the various components are designated by Roman numerals in ascending order from the front to the rear of the objective with the light assumed to come from the front of the objective. The curvatures of the surfaces $C_1$ to $C_{11}$ are marked plus or minus depending on whether the surfaces are convex or concave respectively toward the incoming light.

TABLE I

Focal Length=1.0000; Relative Aperture=F/1.5
Total Field of View=56°
Front Vertex Distance (F.V.D.)=1.3724
Back Focal Length (B.F.)=.4834
Stop Position is .1400 after $C_5$

| Component | Lens | Curvature | Thickness or Spacing | Refractive Index, $N_d$ | Abbé No., $\nu$ |
|---|---|---|---|---|---|
| I | A | $C_1$=1.4870 | $T_1$=.1300 | 1.8028 | 46.8 |
|   |   | $C_2$=.6046 | $S_1$=.0030 | Air |   |
| II | B | $C_3$=2.5267 | $T_2$=.1500 | 1.8028 | 46.8 |
|   |   | $C_4$=1.1372 |   |   |   |
|   | C | $C_5$=4.0977 | $T_3$=.0400 | 1.7847 | 25.8 |
|   |   |   | $S_2$=.2800 | Air |   |
| III | D | $C_6$=−3.4392 | $T_4$=.0400 | 1.9176 | 21.5 |
|   |   | $C_7$=−1.9489 | $S_3$=.0030 | Air |   |
| IV | E | $C_8$=−.5537 | $T_5$=.1300 | 1.8028 | 46.8 |
|   |   | $C_9$=−2.2403 | $S_4$=.0030 | Air |   |
| V | F | $C_{10}$=.2944 | $T_6$=.1100 | 1.8028 | 46.8 |
|   |   | $C_{11}$=−.6141 |   |   |   |

Referring now to FIGURE 2 there is shown another embodiment of an optical objective constructed according to this invention.

The first component (I′) (starting from the front or object side of the objective) is meniscus shaped, positive in power and convex to the front. The first component (I′) is made up of a single element A′. The second component (II′) is meniscus shaped, negative in power and convex to the front. The second component (II′) is in the form of a cemented doublet consisting of a meniscus shaped positive element B′ and a meniscus shaped negative element C′. The third component (III′) is meniscus shaped, negative in power and concave to the front. The third component (III′) is made up of a single element D′. The stop 31 is located in the air space between the second and third components. The fourth component (IV′) is meniscus shaped, positive in power and concave to the front. The fourth component (IV′) is made up of a single element E′. The fifth component (V′) is meniscus shaped, positive in power and concave to the front. The fifth component (V') is made up of a single element F'.

The following is a table of constructional data for one example of an objective constructed according to this embodiment.

TABLE II

Focal Length=1.0000; Relative Aperture=F/2.8
Total Field of View=56°
Front Vertex Distance (F.V.D.)=1.2073
Back Focal Length (B.F.)=.5913
Stop Position is .1250 After Surface C'$_5$

| Component | Lens | Curvature | Thickness or Spacing | Refractive Index, $N_d$ | Abbé No., $\nu$ |
|---|---|---|---|---|---|
| I' | A' | $C'_1=2.4269$ | $T'_1=.0900$ | 1.6204 | 60.3 |
|  |  | $C'_2=1.0077$ | $S'_1=.0020$ | Air |  |
| II' | B' | $C'_3=3.5754$ | $T'_2=.1000$ | 1.6204 | 60.3 |
|  | C' | $C'_4=1.2056$ | $T'_3=.0200$ | 1.6254 | 35.6 |
|  |  | $C'_5=5.4002$ | $S'_2=.2500$ | Air |  |
| III' | D' | $C'_6=-4.7022$ | $T'_4=.0300$ | 1.8052 | 25.4 |
|  |  | $C'_7=-2.8784$ | $S'_3=.0020$ | Air |  |
| IV' | E' | $C'_8=-1.3964$ | $T'_5=.0500$ | 1.6204 | 60.3 |
|  |  | $C'_9=-2.6644$ | $S'_4=.0020$ | Air |  |
| V' | F' | $C'_{10}=-1.2150$ | $T'_6=.0700$ | 1.8028 | 46.8 |
|  |  | $C'_{11}=-2.5585$ |  |  |  |

I claim:
1. A five component six element optical objective made substantially as set forth in the following table:

TABLE I

Focal Length=1.0000; Relative Aperture=F/1.5
Total Field of View=56°
Front Vertex Distance (F.V.D.)=1.3724
Back Focal Length (B.F.)=.4834
Stop Position is .1400 after $C_5$

| Component | Lens | Curvature | Thickness or Spacing | Refractive Index, $N_d$ | Abbé No., $\nu$ |
|---|---|---|---|---|---|
| I | A | $C_1=1.4870$ | $T_1=.1300$ | 1.8028 | 46.8 |
|  |  | $C_2=.6046$ | $S_1=.0030$ | Air |  |
| II | B | $C_3=2.5267$ | $T_2=.1500$ | 1.8028 | 46.8 |
|  | C | $C_4=1.1372$ | $T_3=.0400$ | 1.7847 | 25.8 |
|  |  | $C_5=4.0977$ | $S_2=.2800$ | Air |  |
| III | D | $C_6=-3.4392$ | $T_4=.0400$ | 1.9176 | 21.5 |
|  |  | $C_7=-1.9489$ | $S_3=.0030$ | Air |  |
| IV | E | $C_8=-.5537$ | $T_5=.1300$ | 1.8028 | 46.8 |
|  |  | $C_9=-2.2403$ | $S_4=.0030$ | Air |  |
| V | F | $C_{10}=.2944$ | $T_6=.1100$ | 1.8028 | 46.8 |
|  |  | $C_{11}=-.6141$ |  |  |  |

2. A five component six element optical objective made as set forth in the following table:

TABLE II

Focal Length=1.0000; Relative Aperture=F/2.8
Total Field of View=56°
Front Vertex Distance (F.V.D.)=1.2073
Back Focal Length (B.F.)=.5913
Stop Position is .1250 After Surface C'$_5$

| Component | Lens | Curvature | Thickness or Spacing | Refractive Index, $N_d$ | Abbé No., $\nu$ |
|---|---|---|---|---|---|
| I' | A' | $C'_1=2.4269$ | $T'_1=.0900$ | 1.6204 | 60.3 |
|  |  | $C'_2=1.0077$ | $S'_1=.0020$ | Air |  |
| II' | B' | $C'_3=3.5754$ | $T'_2=.1000$ | 1.6204 | 60.3 |
|  | C' | $C'_4=1.2056$ | $T'_3=.0200$ | 1.6254 | 35.6 |
|  |  | $C'_5=5.4002$ | $S'_2=.2500$ | Air |  |
| III' | D' | $C'_6=-4.7022$ | $T'_4=.0300$ | 1.8052 | 25.4 |
|  |  | $C'_7=-2.8784$ | $S'_3=.0020$ | Air |  |
| IV' | E' | $C'_8=-1.3964$ | $T'_5=.0500$ | 1.6204 | 60.3 |
|  |  | $C'_9=-2.6644$ | $S'_4=.0020$ | Air |  |
| V' | F' | $C'_{10}=-1.2150$ | $T'_6=.0700$ | 1.8028 | 46.8 |
|  |  | $C'_{11}=-2.5585$ |  |  |  |

References Cited

UNITED STATES PATENTS 2,735,340  2/1956  Aklin _____ 350—217
3,049,975  8/1962  Tronnier _____ 350—215

FOREIGN PATENTS 205,766  10/1959  Austria.

DAVID SCHONBERG, Primary Examiner
ALLEN OSTRAGER, Assistant Examiner